United States Patent [19]

Koden et al.

[11] Patent Number: 5,790,218
[45] Date of Patent: Aug. 4, 1998

[54] LIQUID CRYSTAL DISPLAY DEVICE AND METHOD FOR MANUFACTURING THE SAME

[75] Inventors: Mitsuhiro Koden; Aya Miyazaki; Kazuyuki Kishimoto, all of Kashiwa, Japan

[73] Assignee: Sharp Kabushiki Kaisha, Japan

[21] Appl. No.: 756,186

[22] Filed: Nov. 25, 1996

Related U.S. Application Data

[63] Continuation of Ser. No. 535,763, Sep. 28, 1995, abandoned.

[30] Foreign Application Priority Data

Nov. 29, 1994 [JP] Japan .................... 6-295188
Apr. 25, 1995 [JP] Japan .................... 7-101436

[51] Int. Cl.$^6$ .................... G02F 1/1333
[52] U.S. Cl. .................... 349/92
[58] Field of Search .................... 349/86, 92

[56] References Cited

U.S. PATENT DOCUMENTS

| | | | |
|---|---|---|---|
| 4,712,877 | 12/1987 | Okada et al. | 359/56 |
| 5,307,187 | 4/1994 | Sunohara | 359/52 |
| 5,372,745 | 12/1994 | Yoshinaga et al. | 359/52 |
| 5,469,278 | 11/1995 | Takahasa et al. | 359/51 |

FOREIGN PATENT DOCUMENTS 60287108  6/1987  Japan.

OTHER PUBLICATIONS

N.A. Clark and S.T. Lagerwall, Submicrosecond bistable electro-optic switching in liquid crystals, Jun. 1, 1980, pp. 899–901, Appl. Phys. Lett., 36.

*Primary Examiner*—William L. Sikes
*Assistant Examiner*—James Dudek
*Attorney, Agent, or Firm*—David G. Conlin; John L. Welch

[57] ABSTRACT

A liquid crystal display device comprising a pair of electrodes formed on a pair of substrates, a pair of orientation films formed on the substrates to cover said electrodes, and a liquid crystal layer interposed between the substrates, wherein a plurality of pixels are provided between the facing sides of the pair of electrodes, and the liquid crystal layer comprises, in each pixel, regions with continuously or stepwise varying threshold values.

5 Claims, 11 Drawing Sheets

FIG.9(a) FIG.9(b)
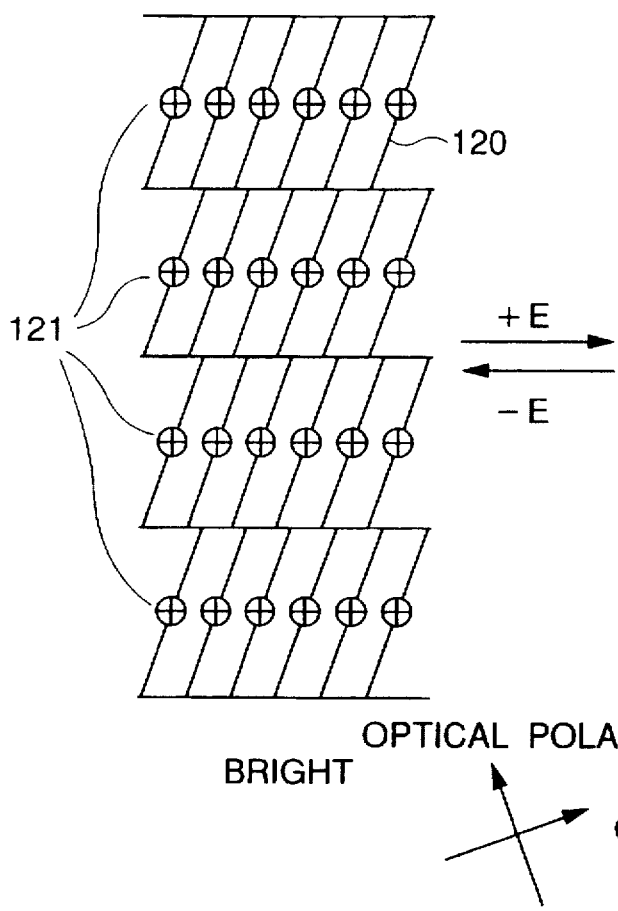
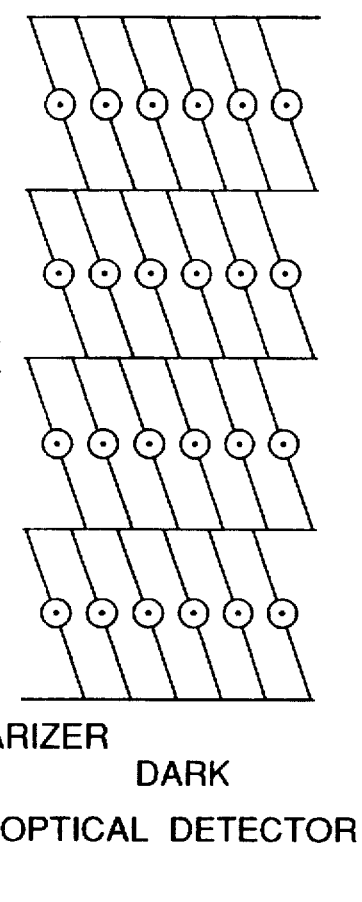
BRIGHT    OPTICAL POLARIZER    DARK
OPTICAL DETECTOR
⊕ ⊙ ; DIRECTION OF SPONTANEOUS POLARIZATION(PS)
FIG.10
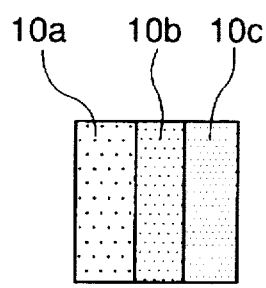

5,790,218

LIQUID CRYSTAL DISPLAY DEVICE AND METHOD FOR MANUFACTURING THE SAME

This application is a continuation of application Ser. No. 08/535,763 filed on Sep. 28, 1995 now abandoned.

BACKGROUND OF THE INVENTION

1. Field of the Invention

The present invention relates to a liquid crystal display device and a method for manufacturing the same. More particularly, the present invention provides a new liquid crystal display device for realizing gradation display and a method for manufacturing the same.

2. Related Art

In a liquid crystal display device, gradation display plays an important part in display performance. Various methods for gradation display are provided. However, it is not easy to achieve gradation display in a liquid crystal element which is fundamentally a two-valued device such as a ferroelectric liquid crystal element.

A ferroelectric liquid crystal display device generally utilizes a liquid crystal phase of chiral smectic C phase for display. This liquid crystal phase possesses, in a bulk state, a molecular sequence with a helical structure. However, when injected into a liquid crystal cell whose distance between the substrates is shorter than the helical pitch, helices in the liquid crystal phase get loose, assuming a layered structure of a plurality of layers 121 laminated in parallel in which the liquid crystal molecules 120 arrange themselves tilted with respect to the layers 121 as shown in FIGS. 9(a) and (b).

When electric field is applied to the liquid crystal phase having the above structure, bistable two states appear, namely the state shown in FIG. 9(a) and the state shown in FIG. 9(b). This is because ferroelectric liquid crystals have spontaneous polarization (Ps) in a direction perpendicular to the printed surface in FIGS. 9(a) and (b) and, when electric field (E) is applied in the direction, liquid crystal molecules 120 rearrange themselves to array spontaneous polarization in the direction of the electric field.

By interposing liquid crystal cells containing such liquid crystals between a pair of polarizing plates (an optical polarizer and an optical detector), selective switching of display between the bright state of FIG. 9(a) and the dark state of FIG. 9(b) will be realized (N. A. Clark and S. T. Lagerwall, Appl. Phys. Lett., 36,899 (1980)).

The above switching between the state of FIG. 9(a) and the state of FIG. 9(b) is performed by a close interaction of the electric field and the spontaneous polarization, so that a high speed response in the order of micro seconds will be realized by switching the direction of applied electric field. Besides, ferroelectric liquid crystals have what is known as a memory property, a property to retain, after the electric field is turned off, the state before the electric field is turned off. Therefore, by utilizing high speed response and memory property, display contents can be written in with a high speed per each scanning line, whereby a simple-matrix type display device having large display capacity can be obtained.

FIG. 12(a) shows a fundamental structure of a liquid crystal display device using a ferroelectric liquid crystal. On the two glass substrates 201 of this liquid crystal display device are formed electrode films 202 of ITO (Indium Tin Oxide), on which are formed insulating films 203 and orientation films 204. Orientation films 204 are generally made of high polymer film such as polyimide and a rubbing treatment is applied to their surface. Those two substrates 201 are bonded together with the cell thickness of about 1.5 μm, and between the two substrates 201 is injected a liquid crystal 205 whose surroundings are sealed with a sealing material 206. On front and rear sides of the liquid crystal cell, there is provided a pair of polarizing plates, for example, an optical detector 207 on one side and an optical polarizer 211 on the other side. To each of the electrode films 202 is connected a driving circuit (not shown).

Ferroelectric liquid crystal display devices with such a structure are no different from the conventional simple-matrix type liquid crystal display device shown in FIG. 12(b) except that the cell thickness is as thin as about 1.5 μm and that the liquid crystal 205 is a ferroelectric liquid crystal. In FIG. 12(b), the same number represents the corresponding part in FIG. 12(a) and 205a in the Figure represents a liquid crystal which is not ferroelectric.

Various methods are proposed to be employed as a gradation display method using the ferroelectric liquid crystals. For example, Japanese Patent Laid-Open (Kokai) Publication No. SHO 62(1987)-145216 discloses the art of obtaining gradation display by continuously varying the cell thickness in a pixel. According to the art, difference in cell thickness induces the electric field intensity to vary and gradation display is obtained by controlling the area ratio of the switching region to the non-switching region. Meanwhile, Fujikake et al. reported that gradation display can be obtained by injecting into ferroelectric liquid crystal cells a mixture solution of ferroelectric liquid crystal and photo-curable prepolymer and then applying light into the cells to photo-polymerize the prepolymer (Fujikake et al., the 41st Joint Lecture Meeting related to Applied Physics, preliminary lecture drafts No. 3, 1120 (1994)). According to the method, the composite of ferroelectric liquid crystal and resin forms a domain structure by photo-polymerization of the prepolymer, and gradation display is obtained by controlling the area ratio of the switching regions utilizing the difference of threshold property in each domain.

However, the above methods generate problems such as described below.

The method of Japanese Patent Laid-Open (Kokai) Publication No. SHO 62(1987)-145216 has a problem that, because the difference in cell thickness causes different molecular orientation, it is hard to obtain, for example, good display in black with sufficiently low amount of transmitted light. Particularly, if a material with negative dielectric anisotropy is used as a ferroelectric liquid crystal material and the driving operation is performed utilizing the specific $\tau$-$V_{min}$ characteristics of the material, memory angle is affected by the electric field intensity when a bias voltage is applied, so that the difference in cell thickness induces different memory angle (different direction of the major molecular axis) in each region, failing to provide display in complete black. Another problem is that a level difference causes irregular orientation, leading to leakage of light therefrom. Moreover, there is a drawback such that continuously changing the cell thickness involves more manufacturing processes, leading to increased costs.

On the other hand, according to the method of Fujikake et al., it is not possible to exactly control the threshold property distribution of the ferroelectric liquid crystal in each pixel, so that it is not easy to provide continuous gradation display characteristics equally in every pixel. Besides, it is necessary to provide domain size sufficiently smaller than the pixel size, which is not always easy to achieve.

SUMMARY OF THE INVENTION

According to the present invention, there is provided a liquid crystal display device comprising a pair of electrodes formed on a pair of substrates, a pair of orientation films formed on the substrates to cover said electrodes, a liquid crystal layer interposed between the above substrates, and a plurality of pixels provided between the facing sides of the above pair of electrodes, wherein the above liquid crystal layer comprises, in each pixel, regions with continuously or stepwise varying threshold values.

Also, according to the present invention, there is provided a method of manufacturing a liquid crystal display device comprising the steps of; bonding together substrates having at least an electrode and an orientation film, interposing between said substrates a mixture of liquid crystal composition and photo-polymerizing resin precursor, and applying light from outside the substrates into a plurality of pixels between the facing sides of the pair of electrodes so as to selectively photo-polymerize the photo-polymerizing resin precursor in each of the pixels, thereby forming a liquid crystal layer comprising, in each pixel, regions with continuously or stepwise varying ratios of resin to liquid crystal composition.

Furthermore, according to the present invention, there is provided a method of manufacturing a liquid crystal display device comprising the steps of; bonding together substrates having at least an electrode and an orientation film, interposing between said substrates a liquid crystal composition, and applying light from outside the substrates into a plurality of pixels between the facing sides of the pair of electrodes so as to selectively photolyze the orientation films, thereby forming in the orientation films regions with continuously or stepwise varying orientation.

BRIEF DESCRIPTION OF THE DRAWINGS

FIGS. 9(a) and (b) are model views illustrating the operation principle of the ferroelectric liquid crystal.

FIG. 10 is a schematic plan view of a photomask for one pixel used for manufacturing a liquid crystal display device of the present invention.

DESCRIPTION OF THE PREFERRED EMBODIMENTS

The present invention is characterized in that the liquid crystal layer comprises, in each pixel, regions with continuously or stepwise varying threshold values. Examples of methods for forming regions with continuously or stepwise varying threshold values include;

(1) stepwise or continuously applying light into a mixture of liquid crystal composition and photo-polymerizing resin precursor for curing to attain, in each pixel, stepwise or continuously varying ratios of resin to liquid crystal composition, thereby forming regions with varying threshold values.

(2) stepwise or continuously applying light into orientation films to selectively photolyze the orientation films for changing the orientation, thereby forming regions with continuously or stepwise varying threshold values.

A liquid crystal display device according to the present invention and a manufacturing method thereof will be described hereinbelow using FIGS. 1(a) to (c).

Figure 1A:
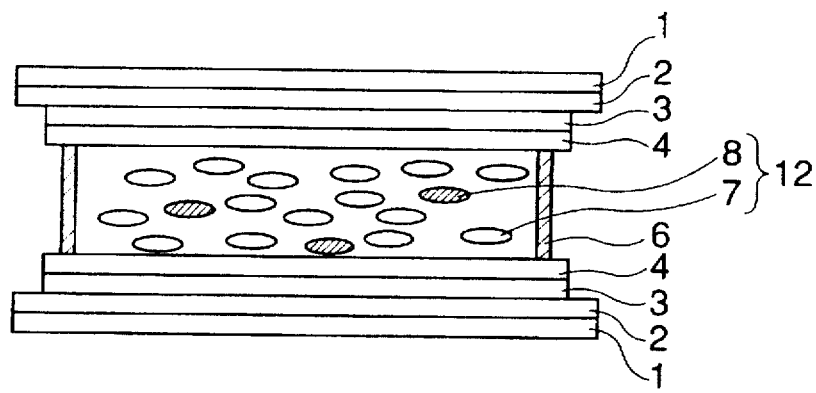
FIGS. 1(a) to (c) are schematic sectional views illustrating the process of manufacturing a liquid crystal display device of the present invention.
Figure 1B:
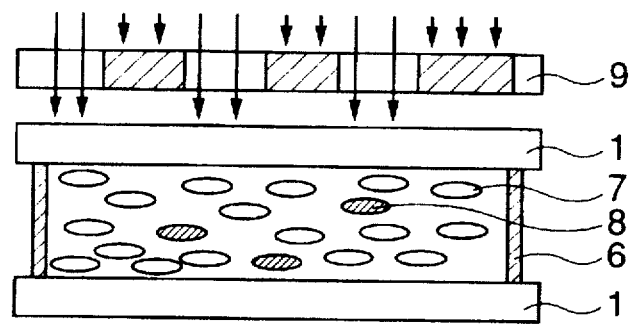
Figure 1C:
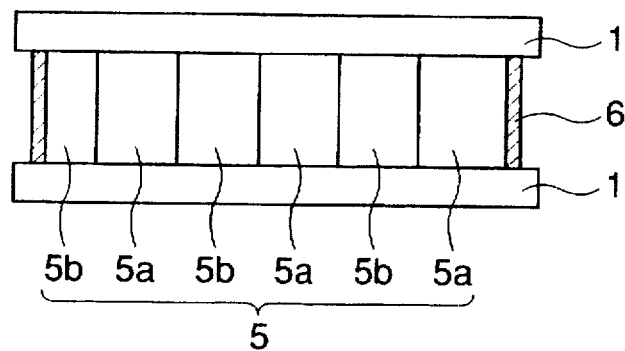

In FIGS. 1(a) to (c), numeral 1 represents a substrate, 2 an electrode, 3 an insulating film, 4 an orientation film, 5a and 5b regions with different ratios of liquid crystal composition to resin, 6 a sealing material, 7 a liquid crystal composition, 8 a photo-polymerizing resin precursor, 9 a photomask, and 12 a mixture, respectively.

First, it is necessary that at least one of the substrates 1 for the present invention is a light-transmitting insulating substrate. The light-transmitting insulating substrate is not specifically limited but may be a glass substrate, a plastic film, or the like. The opaque insulating substrate may be, for example, a silicon substrate coated with an insulating film.

Next, on the above substrate 1 is formed an electrode 2 with a thickness of about 100 to 5000 Å. A transparent electrode such as $InO_3$, $SnO_2$, or ITO, or an opaque electrode such as Al, Ta, Mo, Ni, Au, Cu, or Cr can be used as an electrode. Examples of electrode shape include a shape in which a multilinear first electrode is formed on one of the substrates and a multilinear second electrode perpendicular to the first electrode is formed on the other substrate, and a shape in which a first electrode is formed on the entire surface of one of the substrates and a plurality of spotlike second electrodes are formed on the other substrate. Both of these are electrode configurations of a simple-matrix type, but known electrode configuration of an active-matrix type can also be used. Known methods can be employed for forming these electrodes. For example, a method can be used such that an electrode material is laminated by evaporation method or sputtering method on the entire surface of a substrate which is then patterned into a desired shape by known photolithography.

Here, in the present invention, a pixel means a section where a pair of electrodes face each other. The size of a pixel is around 5 to $10^6$ $\mu m^2$, preferably $10^3$ to $10^5$ $\mu m^2$.

Next, an orientation film 4 is formed on the substrate to cover the above electrode 2. Between the electrode 2 and the orientation film 4 can be interposed an insulating film with a thickness of about 300 to 1000 Å so as to secure insulation between substrates.

Examples of insulating film 3 that can be used for the present invention include inorganic thin film such as $SiO_2$, $SiN_x$, $Al_2O_3$, and $Ta_2O_5$, and organic thin film such as polyimide, photoresist resin and liquid crystal polymer. When inorganic thin film is used as an insulating film, it can be formed by evaporation method, sputtering method, chemical vapor deposition (CVD) method, or solvent coating method. When organic thin film is used as an insulating film, it can be formed by employing spinner coating method, immersion coating method, screen printing method or roll coating method using a solution containing an organic substance or its precursor solution, and then curing under a predetermined curing condition (heating, application of light, etc.), or by employing evaporation method sputtering method or CVD method, or by employing LB (Langmuir-Blodgett) method.

Next, on the electrode 3 or the optionally formed insulating film 3 is formed an orientation film 4 with a thickness of about 50 to 2000 Å which thickness depends on the material to be used.

Inorganic film and organic film are both suitable for an orientation film 4. Examples of inorganic orientation film include $SiO_2$ and $SiN_x$, and examples of organic orientation film include nylon, polyvinyl alcohol, polyimide, liquid crystal polymer, and LB film. The method of forming an inorganic orientation film is not specifically limited but may be evaporation method, oblique evaporation method, rotating evaporation method, sputtering method, or the like. The method of forming an organic orientation film may be coating method, LB method, or the like. Here, if the threshold value within each pixel is to be determined by photolysis by application of light into the orientation film, the method and material for an orientation film (for example, soluble polyimide AL 1254 manufactured by Nippon Synthetic Rubber Co., Ltd.) described on page 232 of the Preliminary Drafts for the 20th Liquid Crystal Forum (1994) can be used.

The orientation film formed as above is further treated with orientation processing, if necessary. The method of orientation processing is not specifically limited but may be rubbing method, oblique evaporation method, rotating evaporation method, LB method, or the like. Among these, rubbing method is preferable for the mass production of a large screen liquid crystal display device. Three types of rubbing method are available, namely, parallel rubbing method (applying a rubbing treatment on both of the paired substrates and then bonding them together so that their rubbing directions will be the same), anti-parallel rubbing method (applying a rubbing treatment on both of the paired substrates and then bonding them together so that their rubbing directions will be opposite), and one-sided rubbing method (applying a rubbing treatment on only one of the paired substrates). Any of the above orientation methods can be used for the liquid crystal display device of the present invention, but the parallel rubbing method is preferable.

The two substrates thus formed are bonded together, and a mixture 12 comprising a liquid crystal composition 7 and a photo-polymerizing resin precursor 8 for forming a liquid crystal layer 5 is inserted between the substrates.

The liquid crystal composition 7 that can be used for the present invention is not specifically limited but can be a mixture of organic compounds that assumes a liquid crystal state at around ordinary temperature such as nematic liquid crystal, cholesteric liquid crystal, smectic liquid crystal, ferroelectric liquid crystal, discotic liquid crystal, and the like. A mixture of these liquid crystals would be suitable as well. Among these liquid crystals, nematic liquid crystal, cholesteric liquid crystal and ferroelectric liquid crystal are preferable. Further, in order to conduct a photo-polymerizing reaction for forming a liquid crystal layer, it is preferable to use a liquid crystal composition that shows good anti-photoreaction property. Specifically, liquid crystal composition comprising a compound having a functional group such as fluorine atom is a preferable example. An especially preferable one is a ferroelectric liquid crystal composition that shows negative dielectric anisotropy ($\Delta\epsilon<0$) and assumes a minimal value on a voltage-memory pulse width curve. Preferable examples of ferroelectric liquid crystal composition that shows $\Delta\epsilon<0$ are those comprising a compound having a functional group with strong polarity such as a cyano group or a fluorine atom in its side chain. By using a ferroelectric liquid crystal composition, utilizing its high speed response in the order of micro seconds and its memory property, there can be provided a simple-matrix type display having a large display capacity. Further, since ferroelectric liquid crystal composition shows negative dielectric anisotropy and assumes a minimal value on a voltage-memory pulse width curve, leakage of light can be prevented and display in complete white or black can be obtained.

Next, the photo-polymerizing resin precursor (a monomer, a prepolymer, and the like) that can be used for the present invention is not specifically limited but can be an acrylic or methacrylic precursor, as long as it does not affect characteristics of the liquid crystal composition.

For example, acrylic acid or acrylic ester having a long-chained alkyl group with three or more carbons or a benzene ring can be used. More specifically, monomers such as isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl methacrylate, and others can be used. Further, in order to heighten the physical strength of the resin, multi-functional resins with two or more functions such as bisphenol A, bisphenol A diacrylate, 1,4-butanediol dimethacrylate, 1,6-hexanediol methacrylate, trimethylolpropane trimethacrylate, trimethylolpropane triacrylate, tetramethylolmethane tetraacrylate, and others can be used. Further, monomers obtained by halogenating (specifically, by chlorinating or fluorinating) 2,2,3,4,4-pentafluorobutyl methacrylate, 2,2,3,4,4,4-hexachlorobutyl methacrylate, 2,2,3,3-tetrafluoropropyl methacrylate, perfluorooctylethyl acrylate, perchlorooctylethyl acrylate, and others can be used. A single monomer or a mixture of two or more monomers selected from the above can be used, and also it can, if necessary, be mixed with a polymer or an oligomer. Commercially available products such as NDA65 (manufactured by Norland Co.) can be used.

The mixing ratio of liquid crystal composition and photo-polymerizing resin precursor depends on the characteristics of the desired liquid crystal display device, but the resin may preferably be contained at 1% to 20% by weight, more preferably at 2% to 5% by weight. If it is 1% or less by weight, the effect exerted by the resin will be meagre, hence not preferable. If it is 20% or more by weight, the orientation will be random and the response will be slow, hence not desirable.

Further, a photo-polymerization initiator can be added to the mixture, if necessary. Examples of initiators include Irugacure 184, 651 and 907, and Darocure 1173, 1116 and 2959 (manufactured by Merck Co.). Preferably, mixing ratio of the initiator to the mixture is around 0.1% to 3% by weight.

The method of interposing the mixture is not specifically limited. For example, it can be a process such that the peripheries of substrates are bonded together using the sealing material 6 and then the mixture is inserted by vacuum injection method or the like. Alternatively, it can be a process such that the mixture is coated on one of the substrates by printing method or the like and then the peripheries of substrates are bonded together using the sealing material 6 to interpose the mixture. Between the substrates, spacers (not shown) may be distributed to maintain a constant width of the liquid crystal layer. The diameter of the spacers is between 1 to 30 µm, preferably between 1 to 5 µm. The above-mentioned method completes a liquid crystal display device prior to application of light as shown in FIG. 1(a).

Next, the mixture is irradiated with light from outside the substrate as shown in FIG. 1(b) to photo-polymerize and resinify the photo-polymerizing resin precursor, thereby forming the liquid crystal layer 5 shown in FIG. 1(c). Here, two regions (5a, 5b) having different threshold values are formed. These two regions, however, can be regions which contain both liquid crystal composition and resin but with different ratios thereof. Alternatively, one of the two regions can be a region consisting of liquid crystal composition only. Further, the device according to the present invention is not limited to having two regions but may comprise a plurality of regions with three or more regions. The electrodes, the insulating films and the orientation films are omitted in FIGS. 1(b) and (c). The method of applying light is not specifically limited but can be a method of selectively applying light using a photomask 9. For example, in case of forming in one pixel two regions having different ratios of liquid crystal composition to resin;

(1) a method by which only the part 5b is irradiated with light using a photomask 9 to form a region 5a containing liquid crystal composition only and a region 5b containing liquid crystal composition and resin, or (2) a method by which only the part 5a is irradiated with light using a photomask 9 for a period of time and then the entire surface is irradiated with light to form a region 5b containing liquid crystal composition and resin and a region 5a containing more resin than the region 5b, or others can be employed.

Further, a method can be employed such that regions having stepwise varying ratios of liquid crystal composition to resin are formed using a photomask having stepwise varying light transmittances.

The above describes cases in which two regions are formed in one pixel. However, by varying the amount of applied light and/or the time for applying light in each region, three or more regions can be formed to realize multi-step gradation display. For example, if it is desired that three regions (a), (b), and (c) are formed in one pixel, they can be formed by first applying light on only (a) for a period of time, then applying light on (a) and (b) for another period of time, and further applying light on all of (a), (b), and (c).

Further, by using a photomask (as shown in FIG. 10 for one pixel) having stepwise varying light transmittances, regions having stepwise varying ratios of liquid crystal composition to resin can be formed, wherein the amounts of cured resin satisfy the relation 10a>10b>10c because the amounts of transmitted light satisfy the relation 10a>10b>10c. The mixture 12 is preferably heated up to a temperature for isotropic liquid state (namely, a state in which the liquid crystal composition and the photo-polymerizing resin precursor are not in phase separation but in uniform mixture) at the time of applying light. More particularly, a two-phase state such as liquid crystal phase and isotropic liquid phase, nematic liquid crystal phase and smectic liquid crystal phase, etc. is liable to be brought about if the temperature of the mixture is lower than that for isotropic liquid state. Such a two-phase state induces concentration distribution in a pixel and obstructs uniform switching of the device, failing to provide gradation display as desired. Therefore, it is necessary to attain uniform concentration distribution before the application of light. A simple way of achieving this is to heat the mixture up to a temperature for isotropic liquid state. With a view to displaying smooth gradation, each region is preferably of equal size.

Figure 11A:
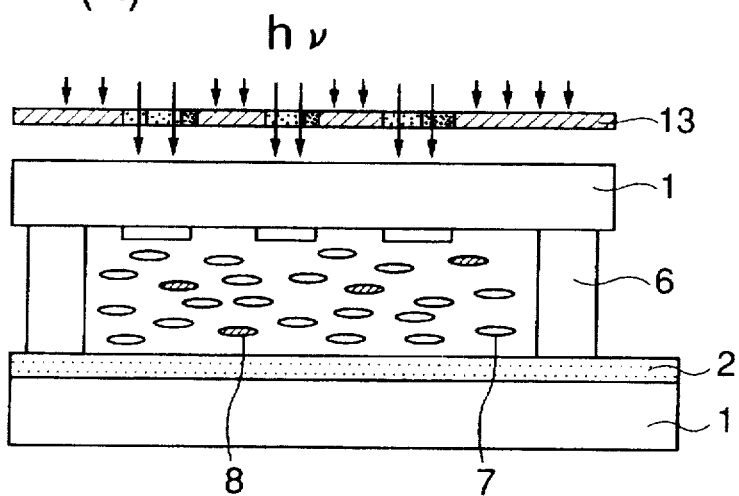
FIG. 11(a) is a schematic sectional view illustrating the process of manufacturing a liquid crystal display device of the present invention.
Figure 11B:
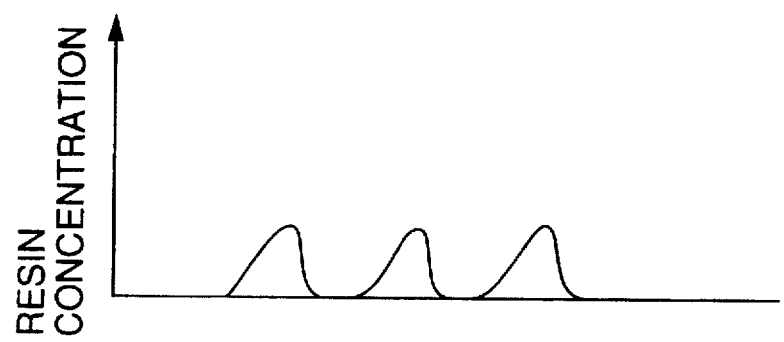
FIG. 11(b) is a graph showing resin concentration after application of light.
Figure 12A:
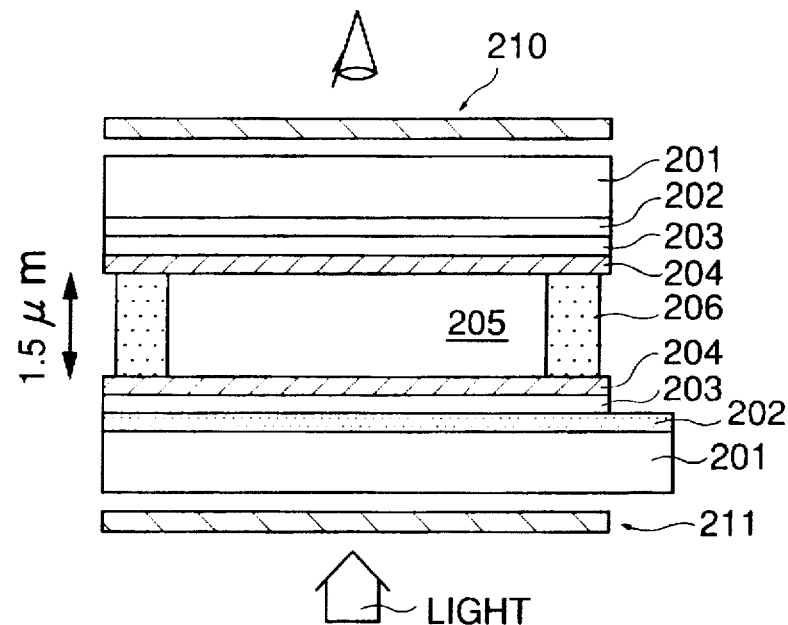
FIG. 12(a) is a schematic sectional view illustrating a conventional liquid crystal display device using a ferroelectric liquid crystal composition.
Figure 12B:
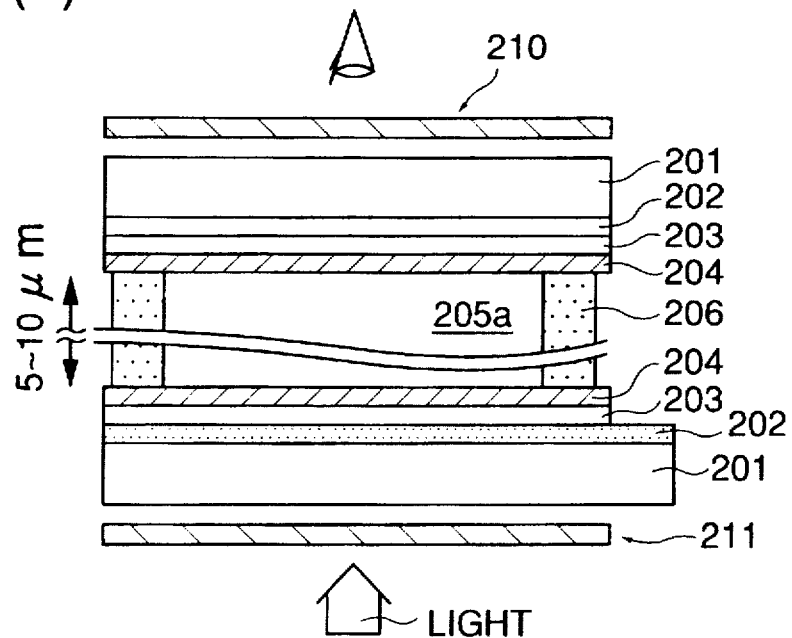
FIG. 12(b) is a schematic sectional view illustrating a conventional simple-matrix type liquid crystal display device.

Further, pixels having continuously varying ratios of liquid crystal composition to resin can be formed by applying light into each pixel using a photomask 13 having continuously varying light transmittances as shown in FIG. 11(a). Resin concentration along the longitudinal direction of FIG. 11(a) is illustrated in FIG. 11(b), which shows that the amount of resin varies continuously in each pixel.

Furthermore, a method can be employed such that regions having varying threshold values are formed by applying light into and selectively photolyzing the orientation films to change their orientations. In this case, it is not necessary to add the above polymerizing resin precursor into the liquid crystal composition. Application of light can be conducted in the same manner as described above. Alternatively, stepwise or continuous application of light can be conducted. Here, application of light is performed after the substrates are bonded together, but the application of light can be performed before the substrates are bonded together.

Figure 3:
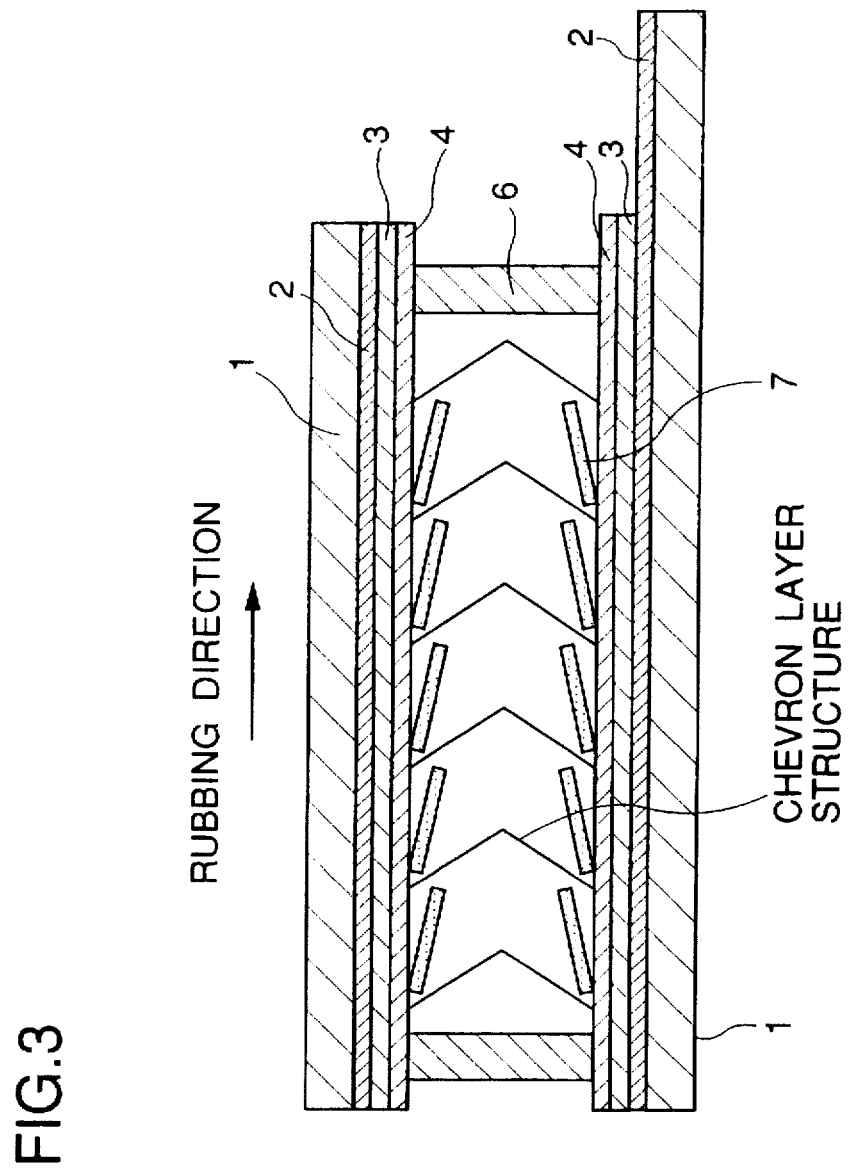
FIG. 3 is a schematic sectional view illustrating C2 orientation.

In order to increase the response speed, it is especially preferable that the liquid crystal composition is a ferroelectric liquid crystal composition and that the liquid crystal layer is C2 oriented with respect to molecular orientation and layer structure thereof. Here, "C2 oriented" means a state in which the ferroelectric liquid crystal composition shows the same pretilt angle with respect to the pair of substrate surfaces and has a chevron layer structure and in which the bending direction of the chevron layer structure is identical to the direction of the above pretilt angle, as illustrated in FIG. 3.

Figure 2:
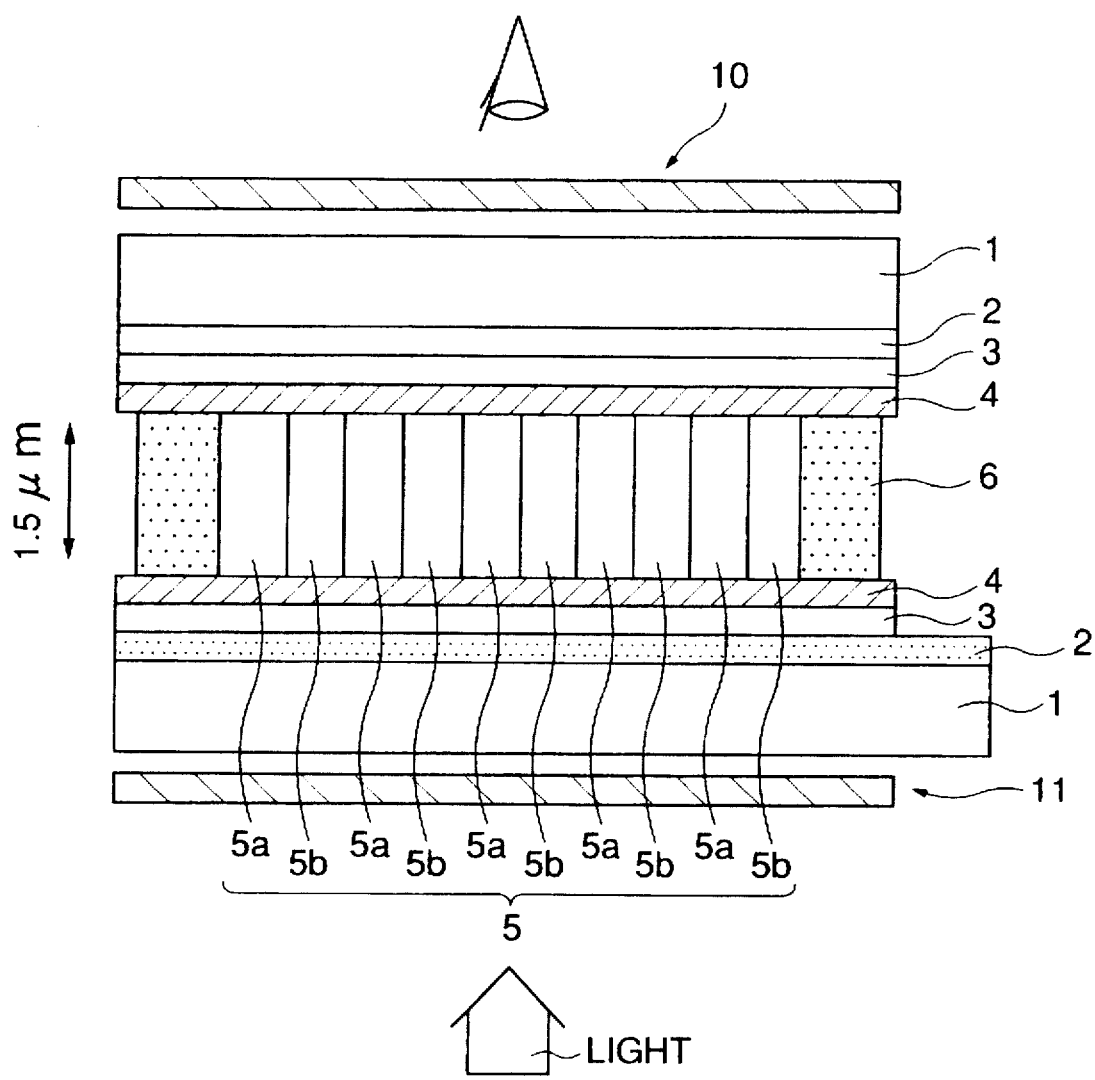
FIG. 2 is a schematic sectional view of the liquid crystal display device of the present invention.

An example of liquid crystal display device manufactured according to the present invention is shown in FIG. 2. A pixel in FIG. 2 comprises two regions 5a and 5b having different mixing ratios of liquid crystal composition to resin. Since liquid crystal molecules are influenced by resin inside the region, liquid crystal molecules in contact with resin undergo, because of the interaction with the resin, difficulties in switching, causing the threshold voltage (hereinafter referred to as Vs) to change. In other words, according as the mixing ratio of resin within the region is raised and the amount of resin which the liquid crystal molecules are in contact with increases, the influence of resin will be greater and Vs will rise. Supposing that the region 5a has a smaller mixing ratio of resin than the region 5b, Vs will be higher in the region 5b. Therefore, the gradation in a pixel will be in three kinds, namely, white (if 5a and 5b are both white), gray (if 5a is black and 5b is white), and black (if 5a and 5b are both black).

Furthermore, polarizing plates 10 and 11 with approximately orthogonal polarizing axes can be disposed above and below the liquid crystal cell. A full color or multicolor display can be obtained by combining the liquid crystal display device of FIG. 2 with a color filter.

EXAMPLES

Example 1

A transparent ITO electrode 2 was formed with a film thickness of 1000 Å on a glass substrate 1 and was patterned into stripes by photolithography. An $SiO_2$ insulating film 3 was formed with a film thickness of 1000 Å on the electrode by spin coating method. Next, a polyimide orientation film 4 was coated with a film thickness of 500 Å and its surface was rubbed.

Figure 4:
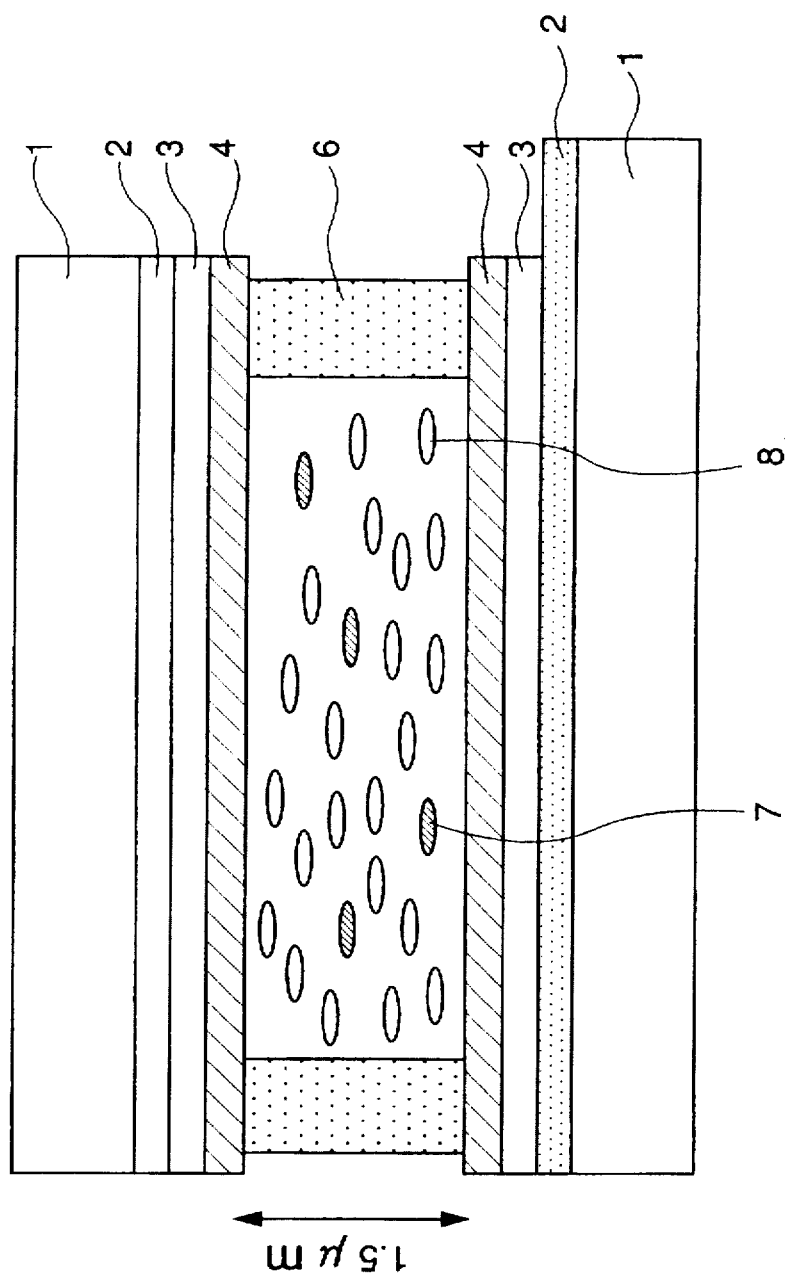
FIG. 4 is a schematic sectional view of the ferroelectric liquid crystal display device according to Examples of the present invention.

On one of the substrates thus formed, spacers (not shown) were distributed so that the substrates are spaced apart by 1.5 μm. The peripheries of the two substrates were then bonded together with a sealing material 6 so that the rubbing directions thereof are approximately the same. Next, a mixture A226 of ferroelectric liquid crystal composition 7 and photo-polymerizing resin precursor 8 as shown in Table 1 was injected by vacuum injection method or the like (See FIG. 4). Here, the ferroelectric liquid crystal composition 7 shows negative dielectric anisotropy. The mixture A226 in Table 1 contained 3% by weight of photo-polymerizing resin precursor.

Figure 5:
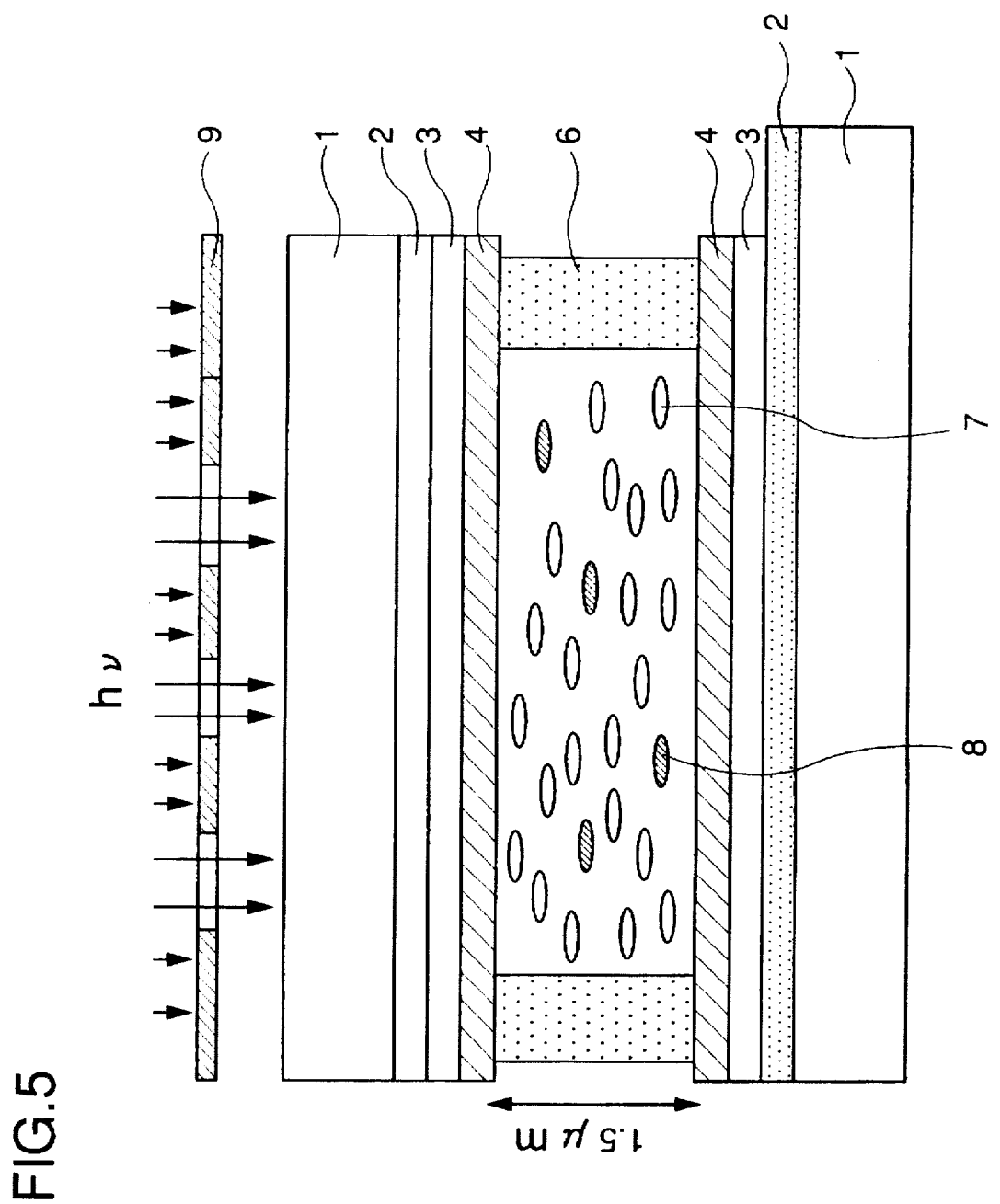
FIG. 5 is a schematic sectional view of the ferroelectric liquid crystal display device according to Examples of the present invention.
Figure 6:
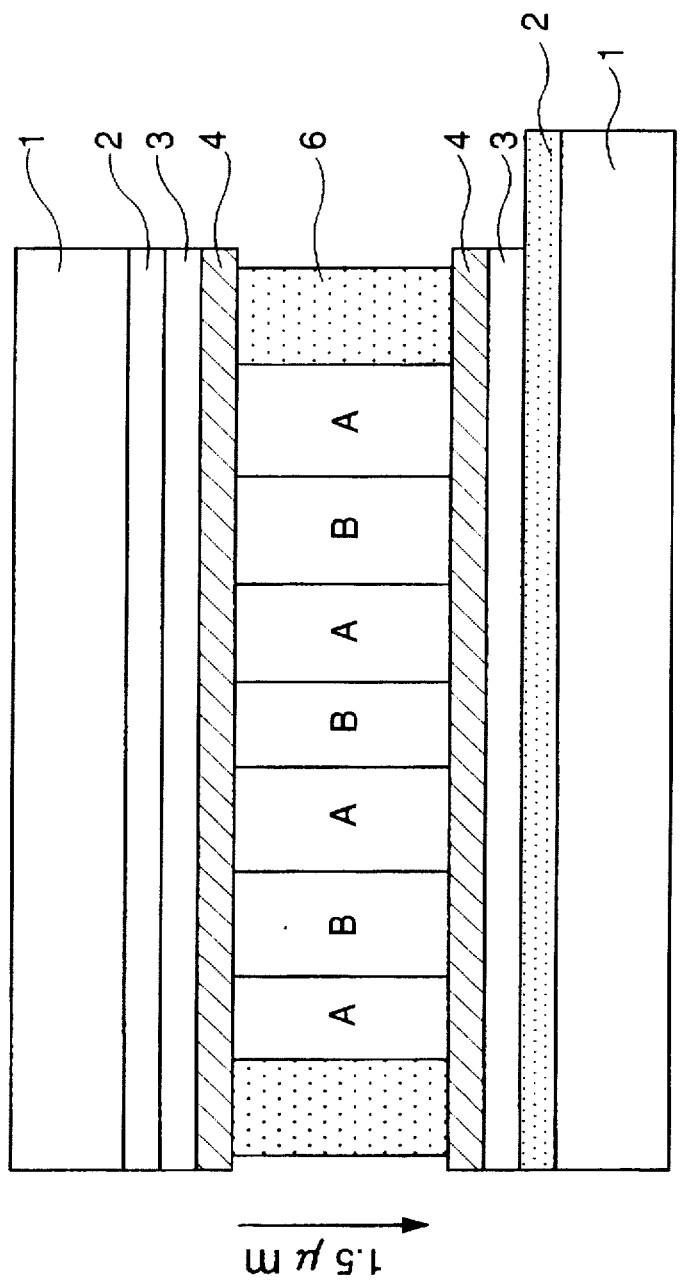
FIG. 6 is a schematic sectional view of the ferroelectric liquid crystal display device according to Examples of the present invention.

Then, selective application of light was conducted using a photomask 9 as shown in FIG. 5 to form a region A having ferroelectric liquid crystal composition only and a region B having a mixture of ferroelectric liquid crystal composition and resin, as illustrated in FIG. 6.

Polarization microscope observation with respect to relation between the direction of zigzag defects and the rubbing direction confirmed that good C2 orientation was obtained in both A and B regions.

Figure 7:
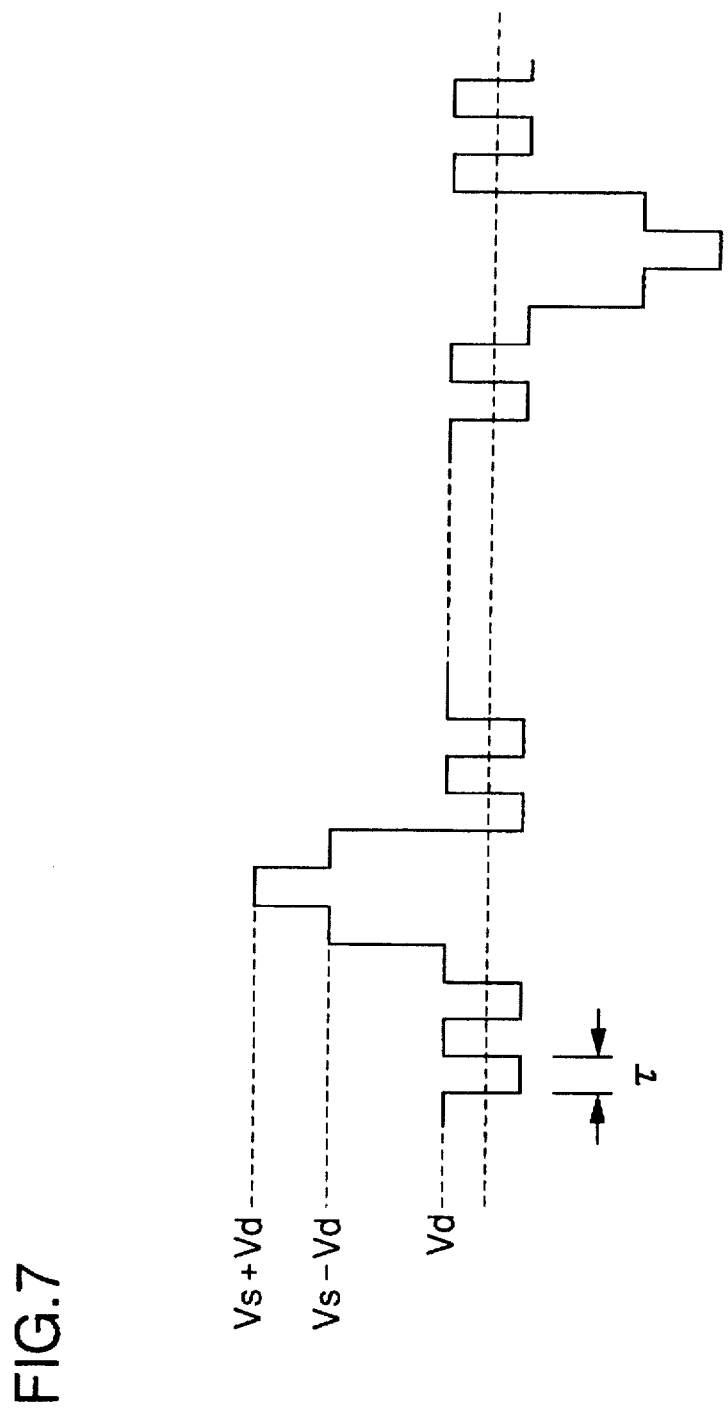
FIG. 7 is a diagram illustrating the driving waveform used in Examples of the present invention.
Figure 8:
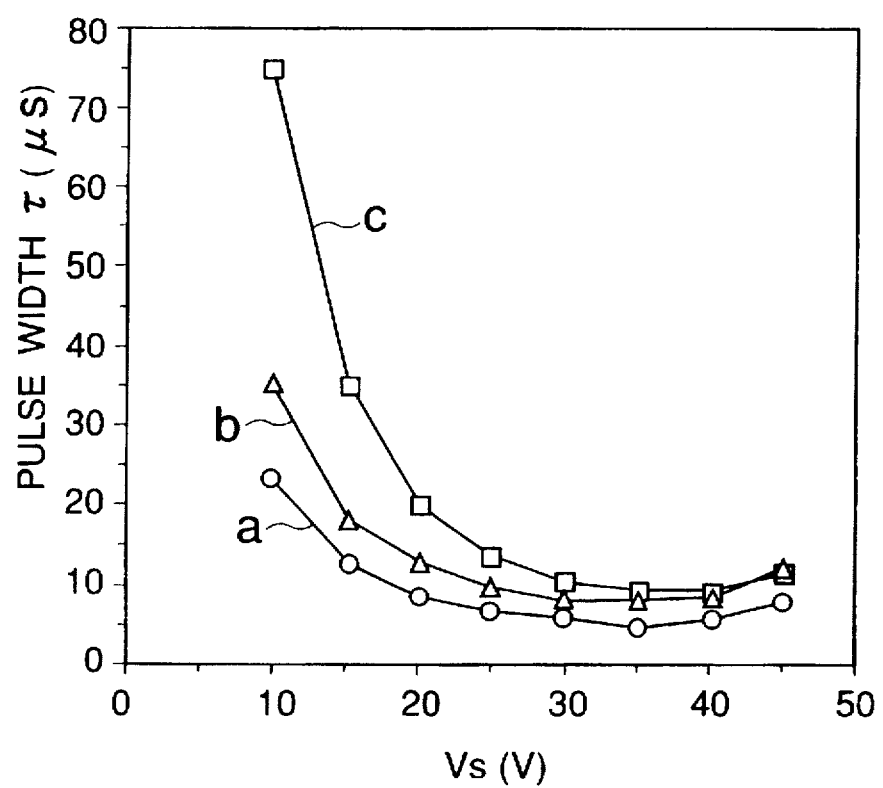
FIG. 8 is a characteristic graph showing Examples of the present invention.

A driving experiment was conducted by applying a driving voltage as shown in FIG. 7 to this liquid crystal display device. Minimum pulse width for bistable switching was plotted in FIG. 8 by setting Vd=5V and applying pulses with varying Vs and pulse width. In FIG. 8, the region A showed a characteristic curve (a) and the region B a characteristic curve (c). Since the two regions A and B showed different characteristic curves (a) and (c) respectively as illustrated in FIG. 8, gradation display was confirmed to be realizable.

Example 2

An experiment was conducted in the same manner as in the Example 1 except that the mixture of ferroelectric liquid crystal composition 7 and photo-polymerizing resin precursor 8 in the Example 1 was replaced by A225 shown in Table 1. The mixture A225 in Table 1 contained 1% by weight of photo-polymerizing resin precursor. Good C2 orientation was realized and a characteristic curve (b) in FIG. 8 was obtained for the region B having the mixture of ferroelectric liquid crystal composition and resin material. Since the two regions A and B in this Example showed different characteristic curves (a) and (b) respectively as illustrated in FIG. 8, gradation display was confirmed to be realizable.

| mixture | A225 | A226 |
|---|---|---|
| ferroelectric liquid crystal composition(*) | 99% | 97% |
| $CH_2=CH-COO+CH_2\}_{12}-O-\bigcirc-\bigcirc{\scriptstyle F\ F}$ | 1% | 3% |

(*)transition temperature: C < room temperature $S_C$ 61° C. $S_A$ 75° C. N 81° C. I

Example 3

A liquid crystal display device was formed in the same manner as in the Example 1 except that a photomask 13 having continuously varying light transmittances in a pixel as described in FIG. 11(a) was used as a photomask.

Polarization microscope observation with respect to relation between the direction of zigzag defects and the rubbing direction confirmed that good C2 orientation was obtained in this liquid crystal display device.

A driving experiment was conducted by applying a driving voltage as shown in FIG. 7 to this liquid crystal display device in the same manner as in the Example 1. Varying the voltage values (Vs and Vd) caused the areas of switchable regions to change, whereby continuous gradation display was confirmed to be realizable.

Since the liquid crystal display device according to the present invention is characterized by comprising, in a pixel, regions with continuously or stepwise varying threshold values, gradation display can be achieved by selective driving of the above regions.

Further, by using a ferroelectric liquid crystal composition, utilizing its high speed response in the order of micro seconds and its memory property, there can be provided a simple-matrix type display having a large display capacity. Responsiveness can be increased if the ferroelectric liquid crystal composition shows the same pretilt angle with respect to the pair of substrate surfaces and has a chevron layer structure and also if the bending direction of the chevron layer structure is identical to the direction of the above pretilt angle.

Furthermore, since ferroelectric liquid crystal composition shows negative dielectric anisotropy and assumes a minimal value on a voltage-memory pulse width curve, leakage of light can be prevented and display in complete white or black can be achieved.

What is claimed is:

1. A method of manufacturing a liquid crystal display device comprising the steps of: bonding together substrates having at least an electrode and an orientation film, interposing between said substrates a mixture of liquid crystal composition and photo-polymerizing resin precursor, the mixing ratio of the photo-polymerizing resin precursor in the mixture being 1 to 5% by weight, and applying light from outside the substrates into a plurality of pixels between the facing sides of the pair of electrodes so as to selectively photo-polymerize the photo-polymerizing resin precursor in each of the pixels, thereby forming a liquid crystal layer comprising, in each pixel, regions with continuously or stepwise varying ratios of resin to liquid crystal composition.

2. A manufacturing method according to claim 1, wherein the mixture is heated up to such a temperature that the mixture becomes isotropic liquid at the time of applying light.

3. A manufacturing method according to claim 1, wherein the application of light is conducted while continuously or stepwise varying the light intensity.

4. A liquid crystal display device comprising a pair of electrodes formed on a pair of substrates, a pair of orientation films formed on the substrates to cover said electrodes, and a liquid crystal layer interposed between the substrates, said liquid crystal layer comprising a mixture of liquid crystal composition and photo-polymerizing resin precursor, the mixing ratio of the photo-polymerizing resin precursor in the mixture being 1 to 5% by weight, wherein a plurality of pixels are provided between the facing sides of the pair of electrodes, and the liquid crystal comprises, in each pixel, regions with continuously or stepwise varying threshold values, and wherein the threshold values are determined by continuously or stepwise varying the ratio of resin to liquid crystal composition contained in the liquid crystal layer.

5. The device of claim 4, wherein the liquid crystal composition and the resin are not in phase separation.

* * * * *